US011966903B2

(12) United States Patent
Dsouza et al.

(10) Patent No.: US 11,966,903 B2
(45) Date of Patent: Apr. 23, 2024

(54) SYSTEM AND METHOD FOR DETERMINING MERCHANT STORE NUMBER

(71) Applicant: VISA INTERNATIONAL SERVICE ASSOCIATION, San Francisco, CA (US)

(72) Inventors: Nelson Dsouza, Palo Alto, CA (US); Sukalyan Chakraborty, Foster City, CA (US); Mahesh Joshi, Belmont, CA (US); Nitin Singhal, San Jose, CA (US); Prithwiraj Mitra, Foster City, CA (US); Abhijith Ramesh Kashyap, San Carlos, CA (US); Urjit Anand Khadilkar, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 188 days.

(21) Appl. No.: 16/585,946

(22) Filed: Sep. 27, 2019

(65) Prior Publication Data

US 2020/0104820 A1 Apr. 2, 2020

Related U.S. Application Data

(60) Provisional application No. 62/739,424, filed on Oct. 1, 2018.

(51) Int. Cl.
*G06Q 20/10* (2012.01)
*G06N 20/00* (2019.01)
*G06Q 20/30* (2012.01)

(52) U.S. Cl.
CPC ........... *G06Q 20/305* (2013.01); *G06N 20/00* (2019.01)

(58) Field of Classification Search
CPC .... G06Q 20/305; G06Q 20/10; G06Q 20/105; G06Q 20/108; G06N 20/00
(Continued)

(56) References Cited

U.S. PATENT DOCUMENTS 9,202,178 B2 * 12/2015 Hall ..................... G06F 16/248
2008/0086365 A1 * 4/2008 Zollino ................. G06Q 30/02
705/7.31
(Continued)

OTHER PUBLICATIONS

Tan, Pang-Ning, et al. Introduction to Data Mining (First Edition); May 12, 2005; Pearson; Pearson; 1st Edition; 487-558 (and accompanying PowerPoint slides for Chapters 8 and 9). (Year: 2005).*

*Primary Examiner* — Hani M Kazimi
(74) *Attorney, Agent, or Firm* — K&L Gates LLP

(57) ABSTRACT

A system and method may retrieve transaction data for a plurality of electronic payment system transactions. The transaction data may describe a plurality of electronic payment transactions between a payment network system and a plurality of merchants. The transaction data may include a transaction location and a merchant store number. The system and method may parse the transaction data to identify the transaction location and the merchant store number and analyze the retrieved and parsed transaction data to identify one or more centroids for at least a portion of the retrieved and parsed transaction data. The one or more centroids may correspond to a merchant location for each transaction of the retrieved and parsed transaction data. The system and method may then clean the retrieved and parsed transaction data having a transaction location outside a threshold distance from the one or more centroids to include accurate merchant store number data.

20 Claims, 6 Drawing Sheets

(58) Field of Classification Search
USPC .......................................................... 705/39
See application file for complete search history.

(56) References Cited

U.S. PATENT DOCUMENTS

| | | | |
|---|---|---|---|
| 2010/0301114 A1* | 12/2010 | Lo Faro ............... | G06Q 20/357 235/380 |
| 2013/0191213 A1* | 7/2013 | Beck ................. | G06Q 30/0207 705/14.64 |
| 2015/0019394 A1* | 1/2015 | Unser ................ | G06Q 20/3224 705/35 |
| 2015/0049943 A1* | 2/2015 | Hamsici .............. | G06K 9/4676 382/170 |
| 2018/0308023 A1* | 10/2018 | Bansal ................ | G06N 5/025 |
| 2019/0026757 A1* | 1/2019 | Yang .................. | G06Q 20/34 |
| 2020/0005192 A1* | 1/2020 | Kumar ................ | G06N 5/025 |
| 2021/0051438 A1* | 2/2021 | Satheesh Kumar .... | H04W 4/70 |

* cited by examiner

SYSTEM AND METHOD FOR DETERMINING MERCHANT STORE NUMBER

BACKGROUND

Merchants are recognized to payment network systems by numerical identification. For example, merchants receive payment for merchant goods and services from their customers through electronic payment devices. During an authorization process for a transaction, electronic payment terminals at each store pass merchant information to backend systems, including a merchant identification. At the store, the merchant identification at each terminal is managed by the merchant. When passed to the backend systems for payment processing, a payee identification for the transaction is assigned by the backend for each merchant based on the merchant identification. For example, a merchant having a single location with a single electronic payment terminal may include "Store A" as its merchant identification to send to the backend for payment processing. Based on this merchant identification, the backend may assign a single payee identification to the set of transactions for that single location owned by the merchant. In a further example, a merchant may have multiple locations having multiple electronic payment terminals with merchant identification data including a store number for each location at each terminal. Using the merchant identification, the backend could analyze transactions based on the merchant and/or store number for rewards provisioning, and other actions by the backend. However, multiple electronic payment terminals at each location, equipment changes, and human error often result in inconsistent naming conventions by multi-store merchants. Because the backend assigns a different payee identification for each merchant identification, these naming mistakes will cause the backend to falsely assign a payee identification number to each transaction of a group of transactions when, in reality, all transactions of the group should include the same payee number. Because the backend generates extra payee identification numbers when the backend interprets merchant identification incorrectly, transaction analysis for each store and merchant can be difficult and based on incorrect and/or incomplete data.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

In some embodiments, a computer-implemented method or a system including a processor and a memory may include instructions for determining accurate merchant store information for each transaction. The system and method may retrieve transaction data for a plurality of electronic payment system transactions. The transaction data may describe a plurality of electronic payment transactions between a payment network system and a plurality of merchants. The transaction data may include a transaction location, and a merchant store number. The system and method may also parse the transaction data to identify the transaction location and the merchant store number and analyze the retrieved and parsed transaction data to identify one or more centroids for at least a portion of the retrieved and parsed transaction data. The one or more centroids may correspond to a merchant location for each transaction of the retrieved and parsed transaction data. The system and method may then clean the retrieved and parsed transaction data having a transaction location outside a threshold distance from the one or more centroids to include accurate merchant store number data.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
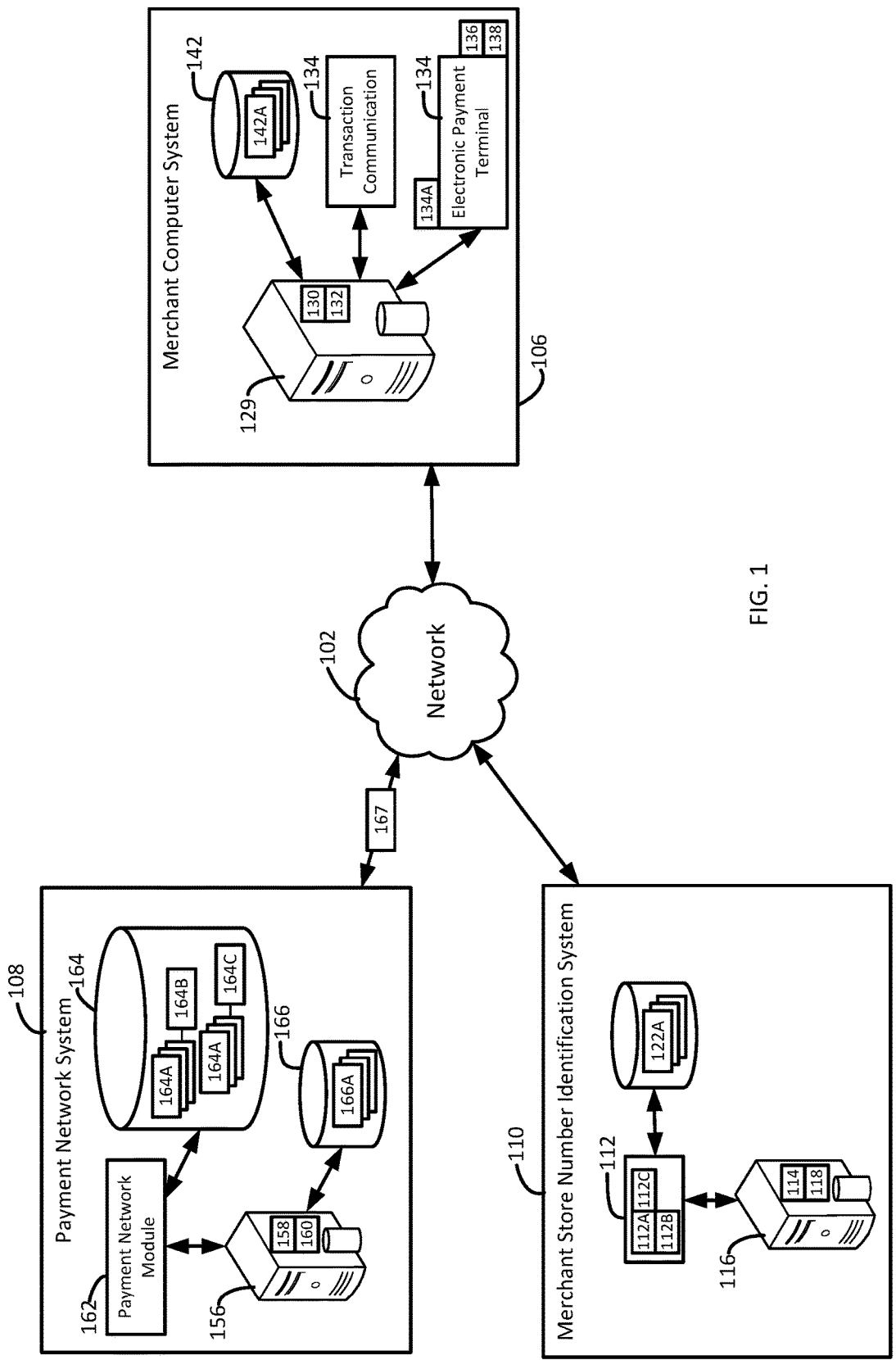
FIG. 1 shows an illustration of an exemplary payment system for determining electronic payment transactions according to each store.

FIG. 1 generally illustrates one embodiment of a payment system 100 for determining merchant store numbers in an electronic payment system where the raw merchant transaction data 142A includes false or misleading store number information. The system 100 may include a computer network 102 that links one or more systems and computer components. In some embodiments, the system 100 includes a merchant computer system 106, a payment network system 108, and a merchant store number identification system 110.

The network 102 may be described variously as a communication link, computer network, internet connection, etc. The system 100 may include various software or computer-executable instructions or components stored on tangible memories and specialized hardware components or modules that employ the software and instructions to identify merchant store number data 122A corresponding to global transaction data 166A of the payment network system 108.

The various modules may be implemented as computer-readable storage memories containing computer-readable instructions (i.e., software) for execution by one or more processors of the system 100 within a specialized or unique computing device. The modules may perform the various tasks, methods, blocks, sub-modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks generally facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The merchant computer system 106 may include a computing device such as a merchant server 129 including a processor 130 and memory 132 including components to facilitate electronic payment transactions with customers and/or a payment device 200 (FIG. 2) via other entities of the system 100. In some embodiments, the memory 132 may include a transaction communication module 134. The transaction communication module 134 may include instructions to send merchant transaction data 142A to other entities (e.g., 106, 108) of the system 100 to indicate a transaction has been initiated with the payment device 200 including payment device data and other data as herein described. The merchant computer system 106 may include a merchant transaction repository 142 and instructions to store payment and other merchant transaction data 142A within the transaction repository 142. The merchant transaction data 142A may only correspond to transactions for products with the particular merchant or group of merchants having a merchant profile (e.g., 164B, 164C) at the payment network system 108 within the merchant profile data repository 164. The merchant transaction data 142A may include at least merchant data 134A from an electronic payment terminal 134. The merchant data 134A may include a store name, a store number, a store location, and a transaction amount. The electronic payment terminal 134 may be a computing device having a processor 136 and a memory 138 including instructions and data (e.g., the merchant data 134A) to facilitate capturing data from a payment device 200 (FIG. 2), appending the merchant data 134A, causing the processor 130 to store merchant transaction data in the transaction repository 142, and causing the transaction communication module 134 to send merchant transaction data 142A to other entities (e.g., 106, 108) of the system 100.

The payment network system 108 may include a payment server 156 including a processor 158 and memory 160. The memory 160 may include a payment network module 162 including instructions to facilitate electronic payment between parties to an electronic payment transaction (e.g., one or more users, merchants, financial institutions issuing the payment device 200, etc.) using the payment system 100. The module 162 may be communicably connected to an account holder data repository 164 including payment network account data 164A. The payment network account data 164A may include any data to facilitate payment and other funds transfers between system entities. For example, the payment network account data 164A may include account identification data, account history data, payment device data, etc. The module 162 may also be communicably connected to a payment network system transaction repository 166 including payment network system global transaction data 166A. The global transaction data 166A may include any data corresponding to a transaction employing the system 100, a payment device 200 (FIG. 2), and the merchant computer system 106. For example, the global transaction data 166A may include, for each transaction across a plurality of merchants, merchant data 134A, merchant transaction data 142A, and data related to a payment or other transaction using a PAN, account identification data, a product name, a product UPC code, an item description, an item category, an item price, a number of units sold at a given price, a merchant ID, a merchant location, a merchant store number, a customer location, a calendar week, and a date, corresponding to each transaction. The module 162 may also include instructions to send payment messages to other entities and components of the system 100 in order to complete transactions with merchants of the merchant computer system 106 who are account holders within the payment network system 108.

The merchant store number identification system 110 may include one or more instruction modules including a merchant store identification module 112. The merchant store identification module 112 may include instructions to cause a processor 114 of a merchant store identification server 116 to functionally communicate with a plurality of other computer-executable steps or sub-modules, e.g., sub-modules 112A, 112B, 112C, and components of the system 100 via the network 102. These modules 112A, 112B, 112C may include instructions that, upon loading into the server memory 118 and execution by one or more computer processors 114, determine merchant store number data corresponding to the global transaction data 166A at a detection module 112A, assist in the detection of global transaction data 166A including incorrect or incomplete store number data using artificial intelligence at an artificial intelligence module 112B, and clean the global transaction data 166A to include correct merchant data 134A, including a correct store number, at a data cleaning module 112C.

A detection module 112A may include instructions that are stored in the memory 118 and executable by the processor 114 to determine a plurality of global transaction data 166A from the global transaction repository 166 that likely include incorrect merchant data 134A. In some embodiments, the detection module 112A may determine incorrect merchant data 134A by identifying a threshold number of distinct merchants corresponding to a single location. For example, the global transaction data 166A may include the merchant data 134A (a store name, a store number, a store location, and a transaction amount), as well as merchant transaction data 142A (payment data including a tokenized personal account number or "PAN", payment dates, communication data, etc.). In some embodiments, the module 112A may include instructions to correlate a merchant location to a store name for each transaction and determine a number of identical or nearly identical store names for each merchant location. Where the number of unique store names is higher than a threshold number for a single location, the corresponding global transaction data 166A likely indicates incorrect merchant data 134A. For example, it is unlikely that more than one or two and certainly not more than ten similarly-named stores would be placed at a single location. Where the global transaction data 166A indicates a number of stores at a single location is higher than a threshold, then errors in the merchant store number for each transaction are likely causing the discrepancy. In some embodiments, the threshold of zero to ten stores at a location indicates a low probability that the merchant data 134A includes errors, the threshold of eleven to twenty-five stores at a location indicates a medium probability that the merchant data 134A includes errors, and the threshold of twenty-five or more stores at a location indicates a high probability that the merchant data 134A includes errors.

An artificial intelligence module 112B may include instructions that are stored in the memory 118 and executable by the processor 114 to assist the detection module 112A in determining which of the global transaction data 166A indicates errors in the merchant store number for each transaction. Further instructions of the artificial intelligence module are described in relation to FIGS. 3 and 4.

A cleaning module 112C may include instructions to edit or remove merchant data from the global transaction data 166A that indicates a probability that the merchant data for the transaction is incorrect, as determined by the detection system 112A assisted by the artificial intelligence system 112B.

Figure 2A:
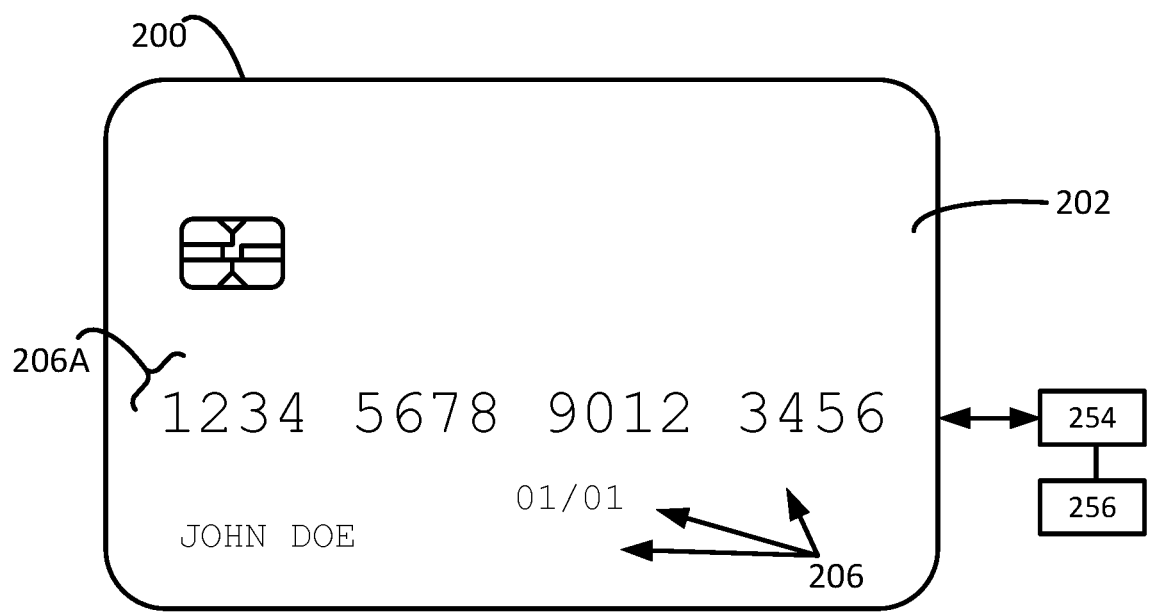
FIG. 2A shows a first view of an exemplary payment device for use with the system of FIG. 1.
Figure 2B:
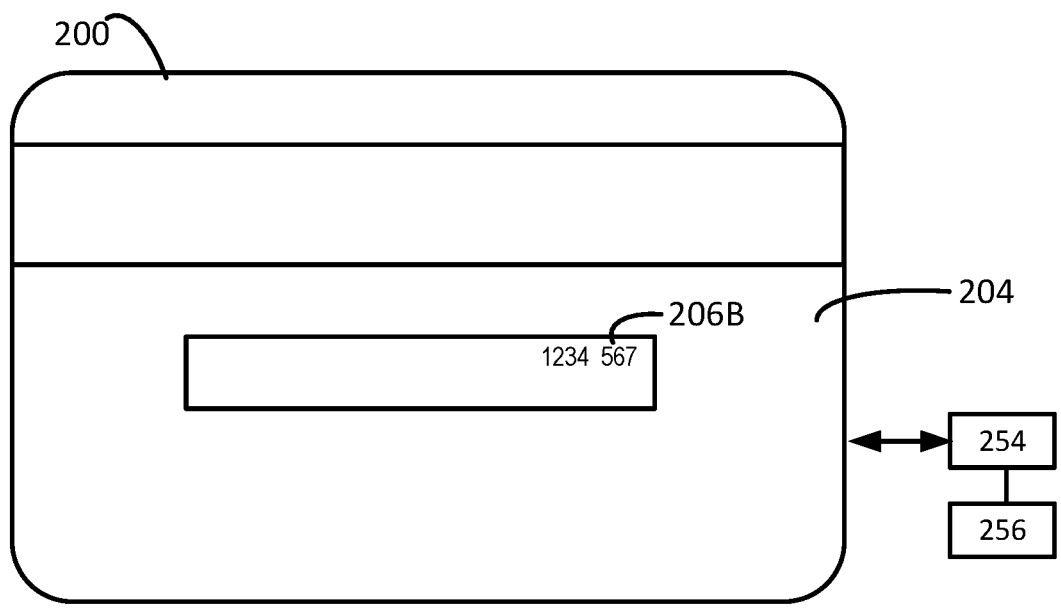
FIG. 2B shows a second view of an exemplary payment device for use with the system of FIG. 1.

With brief reference to FIGS. 2A and 2B, an exemplary payment device 200 for use with an electronic payment terminal 134 may take on a variety of shapes and forms. In some embodiments, the payment device 200 is a traditional card such as a debit card or credit card. In other embodiments, the payment device 200 may be a fob on a key chain, an NFC wearable, or other device. In other embodiments, the payment device 200 may be an electronic wallet where one account from a plurality of accounts previously stored in the wallet is selected and communicated to the system 100 to execute the transaction. As long as the payment device 200 is able to communicate securely with the system 100 and its components, the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 or other forms of legible writing including a personal account number (PAN) 206A and the card verification number (CVN) 206B. In some embodiments, the payment device 200 may include data corresponding to the primary account holder, such as payment network account data 164A for the account holder. A memory 254 generally and a module 254A in particular may be encrypted such that all data related to payment is secure from unwanted third parties. A communication interface 256 may include instructions to facilitate sending payment data 143B, 143A such as a payment payload, a payment token, or other data to identify payment information to one or more components of the system 100 via the network 102.

Supervised Machine Learning

Figure 3:
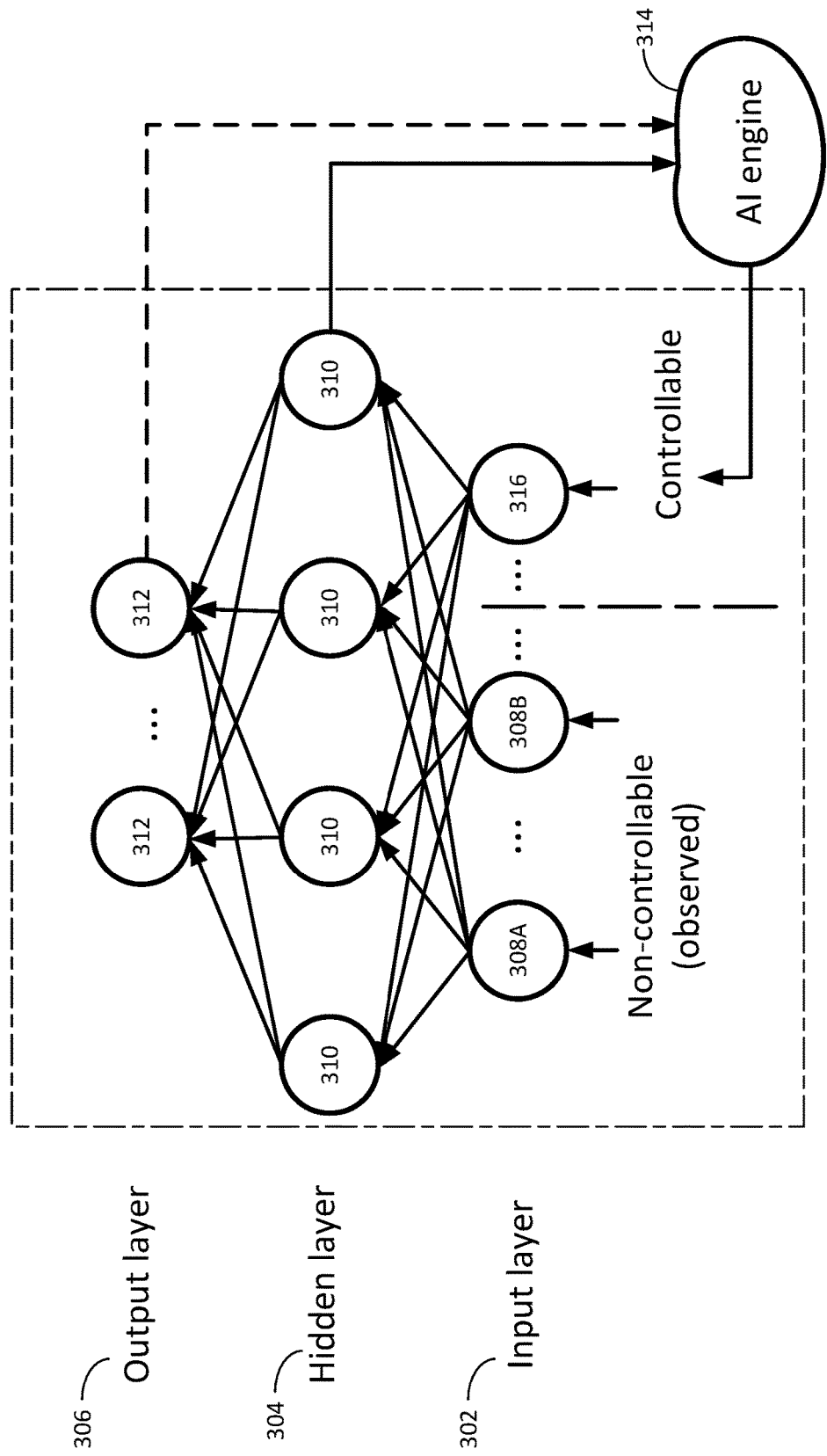
FIG. 3 shows an exemplary machine learning architecture.

With reference to FIG. 3, a machine learning (ML) architecture 300 may be used with the merchant store identification module 112 of system 100 in accordance with the current disclosure. In some embodiments, the AI module 112b of the merchant store number identification system 110 may include instructions for execution on the processor 114 that implement the ML architecture 300. The ML architecture 300 may include an input layer 302, a hidden layer 304, and an output layer 306. The input layer 302 may include inputs 308A, 308B, etc., coupled to the merchant store identification module 112 and represent those inputs that are observed from actual product, customer, and merchant data in the merchant transaction data 142A and global transaction data 166A. The hidden layer 304 may include weighted nodes 310 that have been trained for the transactions being observed. Each node 310 of the hidden layer 304 may receive the sum of all inputs 308A, 308B, etc., multiplied by a corresponding weight. The output layer 306 may present various outcomes 312 based on the input values 308A, 308B, etc., and the weighting of the hidden layer 304. Just as a machine learning system for a self-driving car may be trained to determine hazard avoidance actions based on received visual input, the machine learning architecture 300 may be trained to analyze a likely outcome for a given set of inputs based on thousands or even millions of observations of previous customer/merchant transactions. For example, the architecture 300 may be trained to determine merchant store data to be associated with a merchant profile 164B, 164C.

During training of the machine learning architecture 300, a dataset of inputs may be applied and the weights of the hidden layer 310 may be adjusted for the known outcome (e.g., an actual merchant store number) associated with that dataset. As more datasets are applied, the weighting accuracy may improve so that the outcome prediction is constantly refined to a more accurate result. In this case, the merchant transaction repository 142 and/or the payment network system transaction repository 166 respectively including merchant transaction data 142A and global transaction data 166A may provide datasets for initial training and ongoing refining of the machine learning architecture 300.

Additional training of the machine learning architecture 300 may include the an artificial intelligence engine (AI engine) 314 providing additional values to one or more controllable inputs 316 so that outcomes may be observed for particular changes to the transaction data 142A and 166A. The values selected may represent different data types such as a frequency of the store number occurring in the transaction data 142A, 166A, a frequency with which a particular transaction occurs within the data 142A, 166A, a length of the store number indicated in the data 142A, 166A, and other alternative data presented at various points in the transaction process with the product data and may be generated at random or by a pseudo-random process. By adding controlled variables to the transaction process, over time, the impact may be measured and fed back into the machine learning architecture 300 weighting to allow capture of an impact on a proposed change to the process in order to optimize the determination of the pricing data 144. Over time, the impact of various different data at different points in the transaction cycle may be used to predict an outcome for a given set of observed values at the inputs layer 302.

After training of the machine learning architecture 300 is completed, data from the hidden layer may be fed to the artificial intelligence engine 314 to generate values for controllable input(s) 316 to optimize the pricing data. Similarly, data from the output layer may be fed back into the artificial intelligence engine 314 so that the artificial intelligence engine 314 may, in some embodiments, iterate with different data to determine via the trained machine learning architecture 300, whether the merchant data in the merchant transaction data 142A and global transaction data 166A is accurate, and other determinations.

Figure 4:
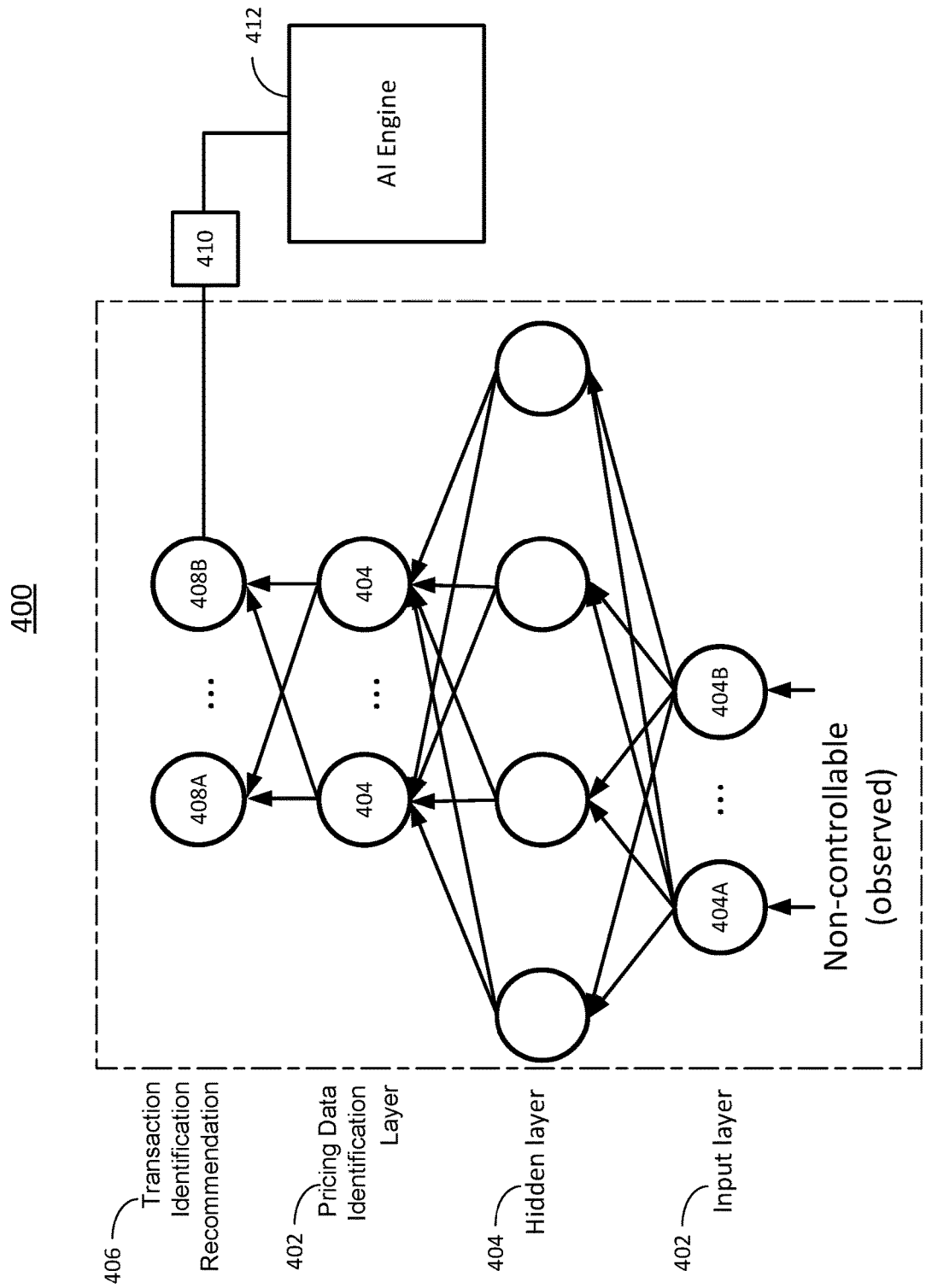
FIG. 4 shows an exemplary artificial intelligence architecture.

With reference to FIG. 4, in other embodiments, the machine learning architecture 300 and artificial intelligence engine 314 may include a second instance of a machine learning architecture 400 and/or an additional node layer may be used. In some embodiments, a merchant data identification layer 402 may determine an optimum store number 404 from observed inputs 404A, 404B. A transaction identification recommendation layer 406 with outputs 408A, 408B, etc., may be used to generate transaction identification recommendations 410 to an artificial intelligence engine 412, which in turn, may modify one or more of the merchant transaction data 142A and global transaction data 166A when communicating this data via an appropriate SDK.

Unsupervised Machine Learning

In other embodiments, instructions of the AI module 112B may implement an unsupervised solution for identifying and correcting merchant store number data via k-means clustering. K-Means clustering is an unsupervised learning algorithm that finds a fixed number (k) of clusters in a set of data. A cluster is a group of data points that are grouped together due to similarities in their features. When using a K-Means algorithm, a cluster is defined by a centroid, which is a point (either imaginary or real) at the center of a cluster. Every point in a data set is part of the cluster whose centroid is most closely located. To put it simply, K-Means finds k number of centroids, and then assigns all data points to the closest cluster, with the aim of keeping the centroids small.

In implementation, the AI module 112B including instructions stored in the memory 118 and executable by the processor 114, may include k-means clustering processes. The module 112B may include instructions to cause the processor 114 assign each of the merchant transaction data 142A and/or global transaction data 166A to the closest corresponding centroid, using straight-line distance between the location for each transaction and the centroid. The module 112B may also include instructions to cause the processor 114 to calculate the mean of the values of all the merchant transaction data 142A and/or global transaction data 166A belonging to each centroid. The mean value becomes the new value of the centroid. All of the centroids have new values that correspond to the means of all of their merchant locations within the merchant transaction data 142A and/or global transaction data 166A. Further instructions of the module 112B may cause the processor 114 evaluate substantially all of the transactions within the merchant transaction data 142A and/or global transaction data 166A to produce further centroid values until there is no change in the centroid values, meaning that all merchant locations have been accurately grouped.

Based on the unsupervised machine learning instructions of the AI module 112B including k-means clustering, the cleaning module 112C edit or flag for editing any merchant data from the merchant transaction data 142A and/or the global transaction data 166A that indicates a probability that the merchant data for the transaction is incorrect. For example, those merchant transaction data 142A and/or global transaction data 166A including a store location that is a threshold distance from a centroid may be attributed to a particular store number of the merchant data 134A. That merchant transaction data 142A and/or global transaction data 166A may then be edited, as needed, to reflect an accurate store number corresponding to the store at or nearest the centroid.

Figure 5:
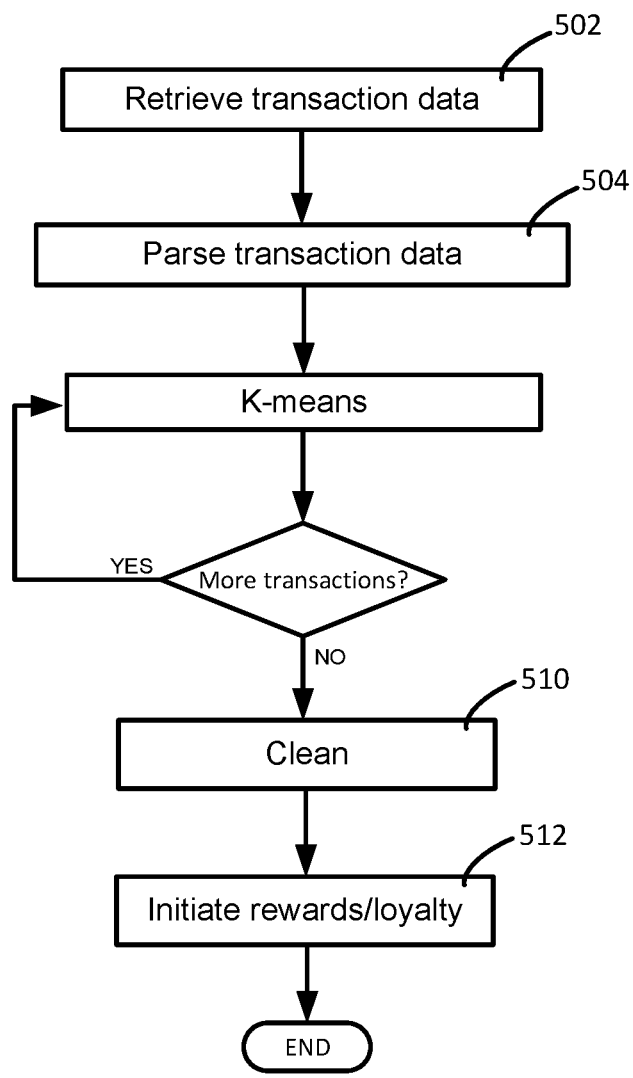
FIG. 5 is a flowchart of a method for determining electronic payment transactions within the system of FIG. 1.

FIG. 5 is a flowchart of a method 500 for determining merchant store number data within the the merchant transaction data 142A and/or the global transaction data 166A. Each step of the method 500 is one or more computer-executable instructions performed on a server or other computing device which may be physically configured to execute the different aspects of the method. Each step may include execution of any of the instructions as described in relation to the system 100. While the below blocks are presented as an ordered set, the various steps described may be executed in any particular order to complete the real-time optimal pricing methods described herein.

At block 502, the method 500 may execute instructions to cause a processor of the system 100 to retrieve the merchant transaction data 142A and/or the global transaction data 166A. At block 504, the method 500 may execute instructions to cause a processor of the system 100 to parse the merchant transaction data 142A and/or the global transaction data 166A to identify elements of the data. For example, the merchant transaction data 142A and/or the global transaction data 166A may include a store name, a store number, a store location, and a transaction amount. Further elements of the merchant transaction data 142A and/or the global transaction data 166A may include data related to the transaction using a PAN, account identification data, a product name, a product UPC code, an item description, an item category, an item price, a number of units sold at a given price, a merchant ID, a merchant location, a merchant store number, a customer location, a calendar week, and a date, corresponding to each transaction.

At block 504, the method 500 may execute instructions to cause a processor of the system 100 to analyze the retrieved and parsed merchant transaction data 142A and/or the global transaction data 166A. In some embodiments, the method 500 may execute instructions of a supervised or unsupervised machine learning technique, as described herein. For example, k-means clustering, an unsupervised machine learning technique, may include instructions to determine a fixed number of clusters within the merchant transaction data 142A and/or the global transaction data 166A. The method 500 may also execute instructions to cause a processor of the system 100 to assign each of the merchant transaction data 142A and/or global transaction data 166A to the closest corresponding centroid, using straight-line distance between the location for each transaction and the centroid. The method may then execute instructions to calculate the mean of the values of all the merchant transaction data 142A and/or global transaction data 166A belonging to each centroid. The method 500 may then assign the mean value as the new value of the centroid.

At block 510, once the processor 114 has evaluated substantially all of the transactions within the merchant transaction data 142A and/or global transaction data 166A to produce further centroid values until there is no change in the centroid values, the method 500 may execute instructions to cause a processor of the system 100 to "clean" the merchant transaction data 142A and/or global transaction data 166A by editing or flagging for editing any merchant data from the merchant transaction data 142A and/or the global transaction data 166A that indicates a probability that the merchant data for the transaction is incorrect. For example, as described above, those merchant transaction data 142A and/or global transaction data 166A including a store location that is a threshold distance from a centroid may be attributed to a particular store number of the merchant data 134A. That merchant transaction data 142A and/or global transaction data 166A may then be edited, as needed, to reflect an accurate store number corresponding to the store at or nearest the centroid.

At block 512, the cleaned merchant transaction data 142A and/or global transaction data 166A may be used to initiate a rewards or loyalty program according to the merchant store locations or be further analyzed to provide merchants with accurate transaction data across multiple store locations and discern their transaction data from the other merchant transaction data 142A and/or global transaction data 166A.

Thus, the present disclosure provides a technical solution to the technical problem of accurately determining merchant store numbers corresponding to transactions with the payment network system 108. The systems and methods described herein may analyze historical transaction data using supervised or unsupervised machine learning techniques, such as k-means clustering, to accurately group transactions with the proper store location for each merchant. The cleaned data may then be used in conjunction with rewards, loyalty, and other programs or may be used by the merchant to implement incentives and other program among various store locations.

Figure 6:
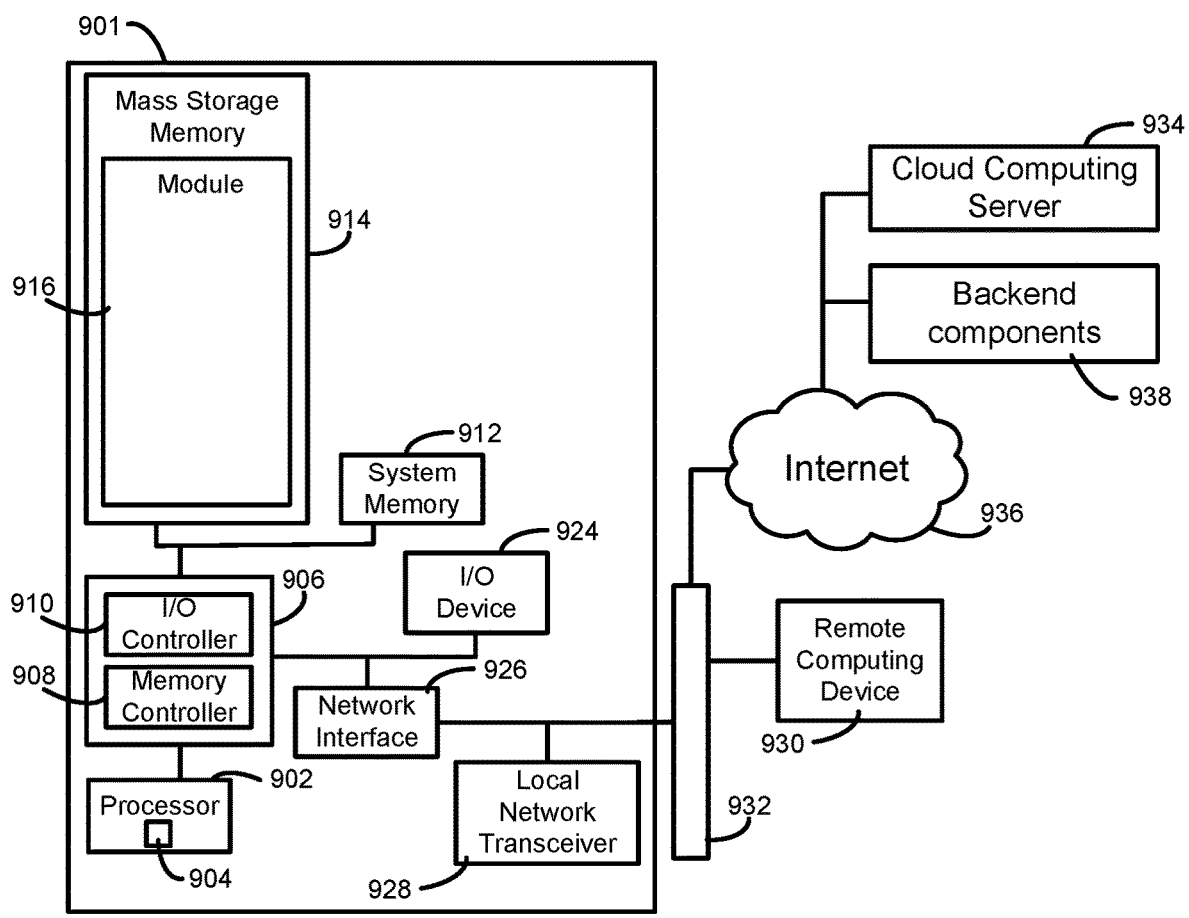
FIG. 6 shows an exemplary computing device that may be physically configured to execute the methods and include the various components described herein.

FIG. 6 is a high-level block diagram of an example computing environment 900 for the system 100 and methods (e.g., method 500) as described herein. The computing device 900 may include a server (e.g., the merchant server 129, payment server 156, merchant store number identification server 116), a mobile computing device, a cellular phone, a tablet computer, a Wi-Fi-enabled device or other personal computing device capable of wireless or wired communication), a thin client, or other known type of computing device.

Logically, the various servers may be designed and built to specifically execute certain tasks. For example, the payment server 156 may receive a large amount of data in a short period of time meaning the payment server may contain a special, high speed input output circuit to handle the large amount of data. Similarly, the merchant store number identification server 116 may execute processor intensive machine learning algorithm and thus the server 116 may have increased processing power that is specially adapted to quickly execute the machine learning algorithms. In yet another example, the merchant server 129 may be under less computing strain than the other servers and may have less processing power.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method of determining merchant store numbers from electronic payment transaction data, the method comprising:

retrieving transaction data for a plurality of electronic payment system transactions, the transaction data describing a plurality of electronic payment transactions between a payment network system and a merchant, the transaction data including a transaction location and a merchant store number for each of the plurality of electronic payment transactions;
parsing the transaction data to identify the transaction location and the merchant store number for each of the plurality of electronic payment transactions;
determining a centroid for the merchant store number for each of the plurality of electronic payment transactions, the centroid corresponding to a merchant store location and the merchant store number for each of the plurality of electronic payment transactions;
iteratively adjusting one or more weights of a hidden layer of an artificial intelligence engine using a straight-line distance between the transaction location and the centroid corresponding to the merchant store location and the merchant store number until the artificial intelligence engine identifies a new centroid for the transaction location, wherein a position of the new centroid is within a threshold distance to the merchant location for a corresponding plurality of transactions of the retrieved and parsed transaction data;
editing or flagging for editing the retrieved and parsed transaction data to include the merchant store number corresponding to the merchant location nearest the new centroid, wherein the retrieved and parsed transaction data includes a transaction location within the threshold distance from the new centroid; and
provisioning the retrieved and parsed transaction data to a rewards program with the merchant in response to editing the retrieved and parsed transaction data with the merchant store number when the position of the new centroid is within the threshold distance of the merchant location corresponding to the merchant store number.

2. The method of claim 1, wherein determining the centroid for the merchant store number includes k-means clustering of the retrieved and parsed transaction data.

3. The method of claim 2, further comprising determining a fixed number of clusters within the transaction data.

4. The method of claim 3, further comprising assigning each cluster of the fixed number of clusters to the centroid.

5. The method of claim 4, further comprising calculating a mean of the transaction data for each cluster.

6. The method of claim 5, further comprising assigning the mean of the transaction data for each cluster as a value for the centroid.

7. A system comprising:
a processor and a memory in communication with the processor, the memory storing instructions that, when executed by the processor, cause the processor to:
retrieve transaction data for a plurality of electronic payment system transactions, the transaction data describing a plurality of electronic payment transactions between a payment network system and a merchant, the transaction data including a transaction location and a merchant store number for each of the plurality of electronic payment transactions;
parse the transaction data to identify the transaction location and the merchant store number for each of the plurality of electronic payment transactions;
determine a centroid for the merchant store number for each of the plurality of electronic payment transactions, the centroid corresponding to a merchant store location and the merchant store number for each of the plurality of electronic payment transactions;
iteratively adjust one or more weights of a hidden layer of an artificial intelligence engine using a straight-line distance between the transaction location and the centroid corresponding to the merchant store location and the merchant store number until the artificial intelligence engine identifies a new centroid for the transaction location, wherein a position of the new centroid is within a threshold distance to the merchant location for a corresponding plurality of transactions of the retrieved and parsed transaction data;
edit or flag for editing the retrieved and parsed transaction data to include the merchant store number corresponding to the merchant location nearest the new centroid, wherein the retrieved and parsed transaction data includes a transaction location within the threshold distance from the new centroid; and
provision the retrieved and parsed transaction data to a rewards program with the merchant in response to editing the retrieved and parsed transaction data with the merchant store number when the position of the new centroid is within the threshold distance of the merchant location corresponding to the merchant store number.

8. The system of claim 7, wherein the instructions to determine the centroid for the merchant store number includes instructions to k-means cluster the retrieved and parsed transaction data.

9. The system of claim 8, further comprising instructions to determine a fixed number of clusters within the transaction data.

10. The system of claim 9, further comprising instructions to assign each cluster of the fixed number of clusters to the centroid.

11. The system of claim 10, further comprising instructions to:
calculate a mean of the transaction data for each cluster; and
assign the mean of the transaction data for each cluster as a value for the centroid.

12. A non-transitory tangible computer-readable medium having computer-executable instructions stored thereon, the computer-executable instructions comprising:
retrieving transaction data for a plurality of electronic payment system transactions, the transaction data describing a plurality of electronic payment transactions between a payment network system and a merchant, the transaction data including a transaction location and a merchant store number for each of the plurality of electronic payment transactions;
parsing the transaction data to identify the transaction location and the merchant store number for each of the plurality of electronic payment transactions;
determining a centroid for the merchant store number for each of the plurality of electronic payment transactions, the centroid corresponding to a merchant store location and the merchant store number for each of the plurality of electronic payment transactions;
iteratively adjusting one or more weights of a hidden layer of an artificial intelligence engine using a straight-line distance between the transaction location and the centroid corresponding to the merchant store location and the merchant store number until the artificial intelligence engine identifies a new centroid for the transaction location, wherein a position of the new centroid is within a threshold distance to the merchant location for a corresponding plurality of transactions of the retrieved and parsed transaction data;

editing or flagging for editing the retrieved and parsed transaction data to include the merchant store number corresponding to the merchant location nearest the new centroid, wherein the retrieved and parsed transaction data includes a transaction location within the threshold distance from the new centroid; and provisioning the retrieved and parsed transaction data to a rewards program with the merchant in response to editing the retrieved and parsed transaction data with the merchant store number when the position of the new centroid is within the threshold distance of the merchant location corresponding to the merchant store number.

13. The non-transitory tangible computer-readable medium of claim 12, wherein the computer-executable instructions for determining the centroid for the merchant store number include instructions for k-means clustering the retrieved and parsed transaction data.

14. The non-transitory tangible computer-readable medium of claim 13, further comprising instructions for determining a fixed number of clusters within the transaction data.

15. The non-transitory tangible computer-readable medium of claim 14, further comprising instructions for assigning each cluster of the fixed number of clusters to the centroid.

16. The non-transitory tangible computer-readable medium of claim 15, further comprising instructions for:

calculating a mean of the transaction data for each cluster; and assigning the mean of the transaction data for each cluster as a value for the centroid.

17. The method of claim 1, wherein the transaction data comprises false or misleading merchant store number information.

18. The method of claim 1, wherein the centroid does not correspond to data specific to a user.

19. The system of claim 7, wherein the transaction data comprises false or misleading merchant store number information.

20. The non-transitory tangible computer-readable medium of claim 12, wherein the transaction data comprises false or misleading merchant store number information.

\* \* \* \* \*